_(12)_ United States Patent
Kagerer et al.

(10) Patent No.: US 9,043,117 B2
(45) Date of Patent: May 26, 2015

(54) DRIVER ASSISTANCE SYSTEM IN A MOTOR VEHICLE COMPRISING A SPEED LIMITING FUNCTION

(71) Applicant: Bayersiche Motoren Werke Aktiengesellschaft, Munich (DE)

(72) Inventors: Walter Kagerer, Munich (DE); Thiemo Pasenau, Munich (DE); Daniel Simmermacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/298,096

(22) Filed: Jun. 6, 2014

(65) Prior Publication Data

US 2014/0364275 A1     Dec. 11, 2014

(30) Foreign Application Priority Data

Jun. 7, 2013    (DE) .......................... 10 2013 210 706

(51) Int. Cl.
*B60W 30/00*      (2006.01)
*B60W 10/184*      (2012.01)
*B60W 10/04*      (2006.01)

(52) U.S. Cl.
CPC ............ *B60W 10/184* (2013.01); *B60W 10/04* (2013.01); *Y10T 477/816* (2013.01); *Y10T 477/644* (2013.01)

(58) Field of Classification Search
None
See application file for complete search history.

(56) References Cited

FOREIGN PATENT DOCUMENTS

| DE | 195 09 492 C2 | 8/1998 | |
|---|---|---|---|
| DE | 100 24 231 A1 | 11/2001 | |
| DE | 20 2010 004 641 U1 | 10/2010 | |
| DE | 10 2009 030 345 A1 | 12/2010 | |
| DE | 10 2009 057 551 A1 | 6/2011 | |
| DE | 10 2010 003 449 A1 | 10/2011 | |
| DE | 10 2011 082 893 A1 | 3/2013 | |
| DE | 10 2011 083 332 A1 | 3/2013 | |
| WO | WO 2010089848 A1 * | 8/2010 | ............ B60W 30/00 |

OTHER PUBLICATIONS

German Search Report dated Feb. 5, 2014 with Statement of Relevancy (Seven (7) pages).

* cited by examiner

*Primary Examiner* — Dirk Wright
(74) *Attorney, Agent, or Firm* — Crowell & Moring LLP

(57) ABSTRACT

In the driver assistance system, a function module is provided for a speed limiting function by which certain conditions for exceeding a predefined maximum speed and for decelerating again down to the maximum speed are implemented. The function module generates signals for carrying out one or more measures to generate or increase the braking torque. The signal for carrying out the measures can be only a binary signal, or can correspond to a required braking torque progression in the form of a regulating step so as to reach the maximum speed within a predefined time period. In the second case, the predefined time period is preferably shorter than a defined time window during which a warning intervention of the speed limiting function is suppressed during an exception where the maximum speed is allowed to be exceeded.

19 Claims, 3 Drawing Sheets

DRIVER ASSISTANCE SYSTEM IN A MOTOR VEHICLE COMPRISING A SPEED LIMITING FUNCTION

CROSS REFERENCE TO RELATED APPLICATIONS

This application claims priority under 35 U.S.C. §119 from German Patent Application No. 10 2013 210 706.4, filed Jun. 7, 2013, the entire disclosure of which is herein expressly incorporated by reference.

BACKGROUND AND SUMMARY OF THE INVENTION

The invention relates to a driver assistance system in a motor vehicle comprising a speed limiting function, including a so-called "escape function."

Such a driver assistance system is known from DE 195 09 492 C2, for example. In this known driver assistance system comprising a speed limiting function, a maximally allowed top speed can generally be predefined. The speed limiting function automatically limits the vehicle speed to this maximum speed, even if the actuation of the gas pedal by the driver under normal circumstances would result in a vehicle speed that is higher than the set maximum speed. In this case, a corrective signal corresponding to the maximum speed is generated independently from the actual driving or gas pedal position, the signal being used to set the engine and the transmission. The specification of the maximum speed can be deactivated by a defined manual intervention on the part of the driver ("escape function"). If in this case the current gas pedal position significantly exceeds the last value of the corrective signal of the speed limiting function, the system attempts to increase the engine torque in the shortest possible time so much that the actual and the desired engine torque agree with each other again.

A certain "escape function" is also described in DE 10 2009 030 345 A1 in connection with a speed limiting function, by way of which the limitation to a predefined maximum speed can be overridden at the driver's input, whereby the maximum speed can be exceeded, at least temporarily, without a warning intervention (visually, acoustically or haptically).

Moreover, it is known that motor vehicles consume very little fuel when they "coast," which is to say when they use their kinetic energy to roll as far as possible, without being decelerated by the drag torque of the engine (coasting mode). For example, a method for operating a drive train in a motor vehicle is known from DE 10 2009 057 551 A1, wherein the internal combustion engine is decoupled from the driving wheels while the vehicle is driving when predetermined operating conditions exist, which is to say a transition is made to a coasting operation or coasting mode.

Finally, vehicles with automatic transmissions are already available on the market, wherein the automatic transmission in an automatic operation of the transmission is switched to a coasting mode of the drive train when defined operating conditions exist by disconnecting the operative connection between the internal combustion engine and the driving wheels, such as by disengaging the torque converter lock-up clutch or a clutch in the transmission. If a manual upshift or downshift command is made by the driver during the coasting mode by way of operating elements provided for this purpose, the coasting mode is abandoned and a switch is made to normal operation of the drive train, which is to say the operative connection between the internal combustion engine and the driving wheels is restored.

It is the object of the invention to improve a driver assistance system comprising a speed limiting function with respect to increasing the acceptance thereof.

This object is achieved according to the invention by the subject matter of the independent claim(s). The dependent claims are advantageous refinements of the invention.

The invention is based on the following realization:

A number of criteria are decisive for modern drivers today so as to increase the acceptance of driver assistance systems. A driver assistance system should assist, but not intervene or warn unnecessarily. In addition, efficiency should be as high as possible, and fuel consumption should be as low as possible.

The method according to the invention takes these requirements into consideration, for example when returning from the above-mentioned "escape function," which allows the basically predefined maximum speed to be temporarily exceeded.

Known driver assistance systems comprising a speed limiting function, such as a speed limit device (SLD), limit the vehicle speed to a value selected by the driver. For this purpose, typically no braking is carried out, but only the drive system or the driving torque is regulated.

The drive system is being increasingly optimized as part of energy-related and fuel-saving efficiency measures. For example, the above-mentioned coasting operation or a generally longer gear ratio is selected to reduce friction losses. This results in no or only low drag delays.

If a motor vehicle, equipped with (braking torque-reducing) efficiency measures and a speed limiting function, as a result of a certain condition temporarily drives faster than the maximum speed that is predefined by the driver, the vehicle is very slowly decelerated to the maximum speed due to the efficiency measures only if the particular condition is no longer present. The vehicle speed thus may remain above the maximum speed predefined by the driver for a long period. However, if this is the case, the customer's expectation for speed limitation is not met. In addition, according to general regulations (such as Euro NCAP requirements) a warning must be issued when the set maximum speed is exceeded too long so as to prompt the driver to manually brake. This lowers the benefit for the customer and is nonsensical from an energy perspective since the driver increases the friction losses again by actuating the brake system.

According to the invention, the braking torque is thus increased, in particular by influence on the driving torque or the drive drag behavior, when the maximum speed has been exceeded and must be reduced again as part of the limiting function. Increasing the braking torque shall also be understood to mean generating or allowing a braking torque when the starting point is a previously prevented braking torque.

In particular the following certain conditions may cause the maximum speed to be exceeded:

"escape function": the activation of the above-mentioned escape function, in particular due to rapid or almost full depression of the gas pedal;

"reduction of the maximum speed": the reduction of the maximum speed or the activation of the limiting function, with specification of a (new) maximum speed, which in each case is below the current actual vehicle speed;

"unintended acceleration": the unrequested (unintentional) increase in the vehicle speed due to gradients, generally without actuation of the gas pedal, as long as the vehicle speed has not risen by more than a predefined comparatively low value above the maximum speed.

If these conditions are no longer present, deceleration to the maximum speed must take place as quickly as possible. According to the invention, this is achieved by way of a function module for controlling the longitudinal dynamics, in particular for drag or braking torque generation of the drive system. For example, this function module may be included as a program module in an electronic control unit for controlling the internal combustion engine and/or electric motor and/or automatic transmission.

Deceleration to the maximum speed by increasing or generating a braking torque can be carried out either in a controlled or regulated manner; this means that at least one measure is carried out, and preferably multiple measures are carried out in stages, to increase or generate the braking torque for expedited deceleration. A particularly advantageous measure is to prohibit or deactivate the above-mentioned coasting operation. Moreover, in particular in the case of electric or hybrid vehicles, the activation of increased regenerative operation is particularly advantageous. Further measures can include deliberate downshifts in automatic transmissions or the deliberate activation of secondary consumers (such as generator or air conditioning compressor).

According to the invention, a function module is thus provided for the speed limiting function, in which certain conditions for exceeding the maximum speed and for decelerating again to the maximum speed are implemented. Moreover, the function module generates signals for carrying out measures to generate or increase the braking torque. For this purpose, a signal for carrying out a measure can be a binary signal (such as "coasting operation prohibited"/"coasting operation allowed"), which only increases the deceleration in the form of a control step. However, the signal for carrying out a measure can also be a required braking torque progression in the form of a regulating step so as to reach the maximum speed within a predefined time period. In the second case, the predefined time period is preferably shorter than a defined time window during which a warning intervention of the speed limiting function is suppressed during an exception where the maximum speed is allowed to be exceeded. In this way, both unpleasant warning interventions and the necessity for a manual braking intervention by way of friction are automatically prevented.

The drawings show one exemplary embodiment of the invention. The drawings show three examples for increasing a braking torque according to the invention after the certain conditions mentioned above by way of example have ended, which in exceptions can cause a maximum speed to be exceeded. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

The exemplary embodiments are based on a speed limiting function in which a predefinable maximum speed is generally not to be exceeded—except for exceptions in which the above-mentioned certain conditions are present—even if a higher vehicle speed would be prompted by the position of the gas pedal without the limiting function.

Figure 1:
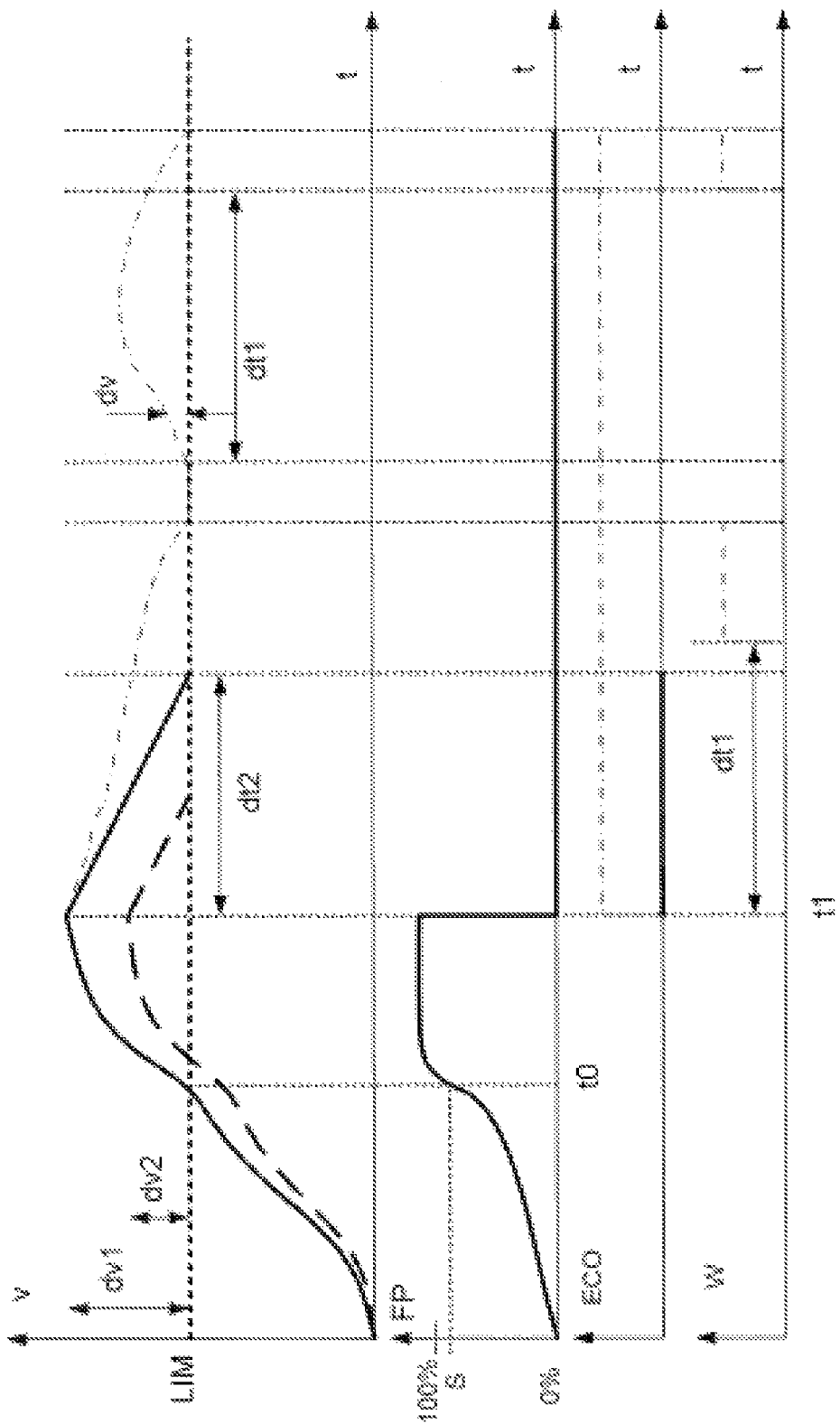
FIG. 1 shows a generation of a braking torque after the "escape function" condition has ended.
Figure 2:
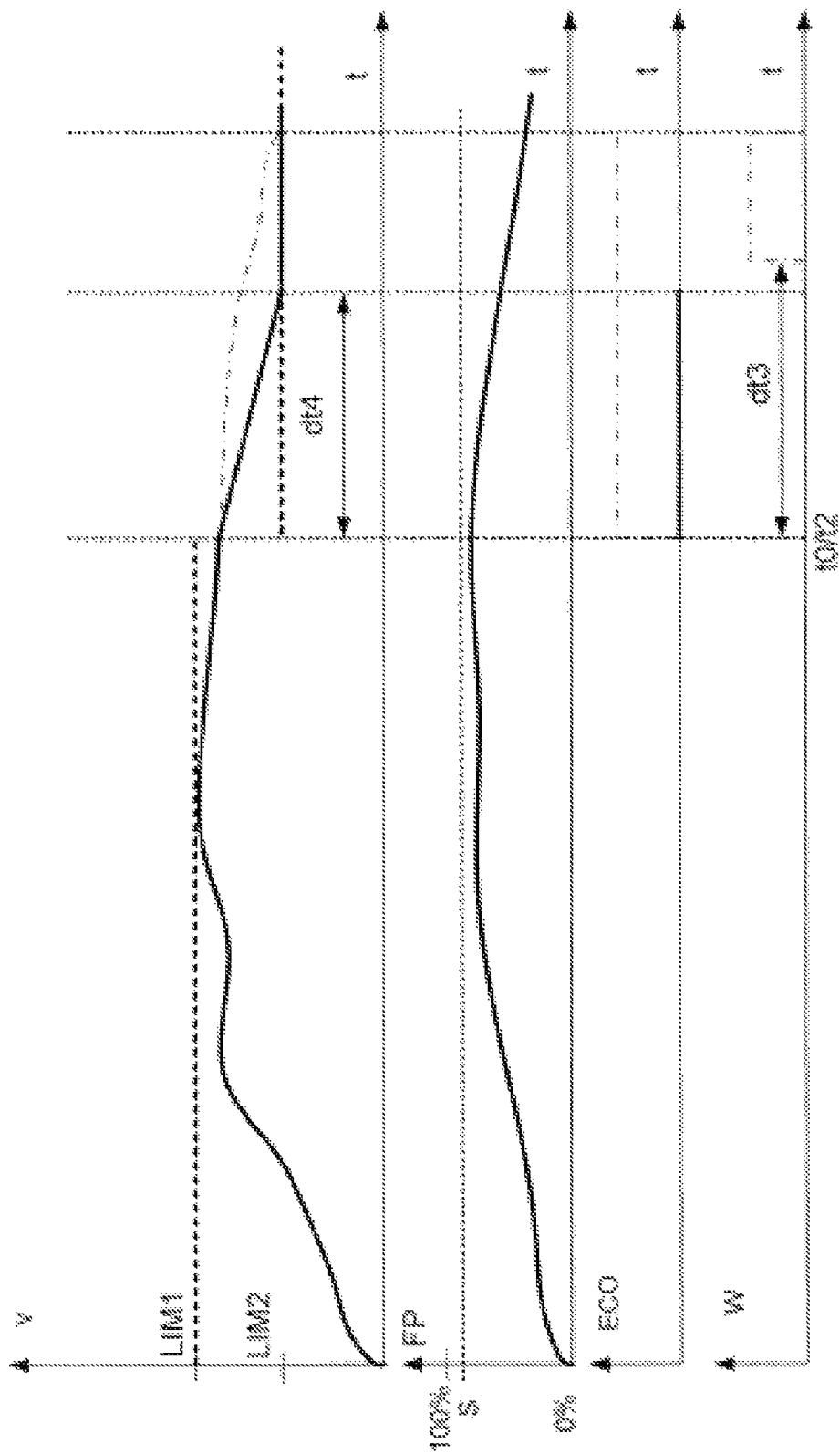
FIG. 2 shows a generation of a braking torque after the "reduction of the maximum speed" condition has ended.
Figure 3:
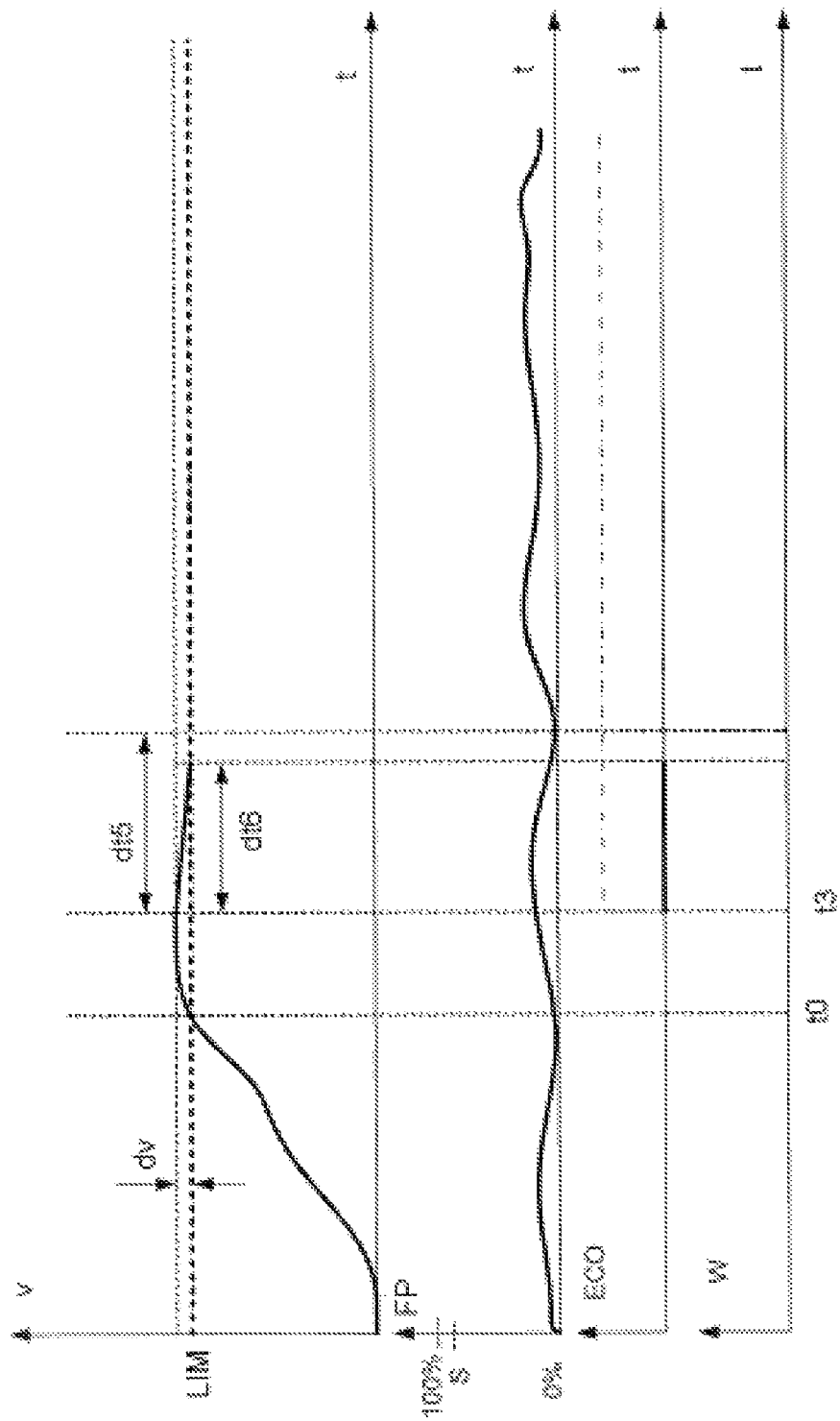
FIG. 3 shows a generation of a braking torque after the "unintended acceleration" condition has ended.

FIGS. 1 to 3 show the vehicle speed v, the gas pedal angle FP, a measure ECO for generating a braking torque, and a warning intervention W, in each case over the time t.

In FIG. 1, the predefined maximum speed LIM is exceeded in an exception with the presence of an "escape function," here when the angle of the gas pedal FP is greater than a defined threshold value S at the point in time t0. At the point in time t1, this particular condition is no longer present. Starting at the point in time t1, a braking torque is thus generated or increased so as to reduce the vehicle speed v again to the maximum speed LIM. The vehicle speed v is preferably reduced to the predefined maximum speed LIM by generation of a corresponding braking torque within a predefined time period dt2. The predefined time period dt2 is shorter here than a time window dt1 during which a warning intervention W (such as an acoustic alarm and/or flashing light) of the speed limiting function is suppressed during an exception where the maximum speed is allowed to be exceeded. So as to reduce the vehicle speed v, in the simplest case a coasting operation can be deactivated, for example; this is indicated by the signal ECO equal to zero. Should a deceleration to the maximum speed LIM not be achievable by way of this first measure, further measures such as the activation of a regenerative function or the downshift of an automatic transmission may be taken. The time period dt2 can depend on the degree of dv1 (Example 1, solid line) or dv2 (Example 2, dotted line) in which the maximum speed LIM is exceeded. However, it can also be predefined to always be the same.

In FIG. 2, the predefined (new) maximum speed LIM2 is exceeded in an exception with the presence of a "reduction of the maximum speed," here at the point in time t0. At the point in time t2 (here, t2 immediately follows t0), this particular condition is no longer present. Starting at the point in time t2, a braking torque is thus generated or increased so as to reduce the vehicle speed v to the (in this case new) maximum speed LIM2. The vehicle speed v is preferably reduced to the predefined maximum speed LIM2 by generation of a corresponding braking torque within a predefined time period dt4. The predefined time period dt4 is shorter here than a time window dt3 during which a warning intervention W of the speed limiting function is suppressed during an exception where the maximum speed is allowed to be exceeded.

So as to reduce the vehicle speed v, in the simplest case a coasting operation can again be deactivated: ECO equal to zero. Should a deceleration to the maximum speed LIM not be achievable by way of this first measure, further measures such as the activation of a regenerative function or the downshift of an automatic transmission may likewise be taken here. The time period dt4 can depend on the difference between the new maximum speed LIM2 and the previous maximum speed LIM1.

In FIG. 3, the predefined maximum speed LIM is exceeded in an exception up to a predefined comparatively low permissible value dv above the maximum speed LIM with the presence of an "unintended acceleration," here when at the point in time t0 the angle of the gas pedal FP is almost zero, however the vehicle speed v is still increasing due to a gradient. At the point in time t3, this particular condition is no longer present since then the vehicle speed v has increased by more than the predefined comparatively low permissible value dv above the maximum speed LIM. Starting at the point in time t3, a braking torque is thus generated or increased so as to reduce the vehicle speed v again to the maximum speed LIM. The vehicle speed v is preferably reduced to the predefined maximum speed LIM by generation of a corresponding braking torque within a predefined time period dt6. The predefined time period dt6 is shorter here than a time window dt5 during which a warning intervention W (such as an acoustic alarm and/or flashing light) of the speed limiting function is suppressed during an exception where the maximum speed is allowed to be exceeded (by a comparatively small amount).

So as to reduce the vehicle speed v, in the simplest case a coasting operation can again be deactivated: ECO equal to zero. Here, this measure should allow a deceleration to the maximum speed LIM to be achievable quickly. The time period dt6 is comparatively short since the amount by which the value dv is allowed to be exceeded is comparatively small.

The dash-dotted lines in FIGS. 1 to 3 in each case, for comparison, show the signals that would result according to the prior art if the drive system or the longitudinal dynamics were to still controlled in a friction loss-minimizing manner (such as with the coasting operation activated).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle comprising a speed limiting function, as a result of which a predefinable maximum speed is not to be exceeded except during the occurrence of at least one certain condition, wherein the driver assistance system comprises a function module configured to control the longitudinal dynamics of the motor vehicle such that, in the event of the at least one certain condition whereby the predefined maximum speed is allowed to be exceeded, a vehicle speed is reduced to the predefined maximum speed by increasing a braking torque starting at a point in time at which the at least one certain condition is no longer present.

2. The driver assistance system according to claim 1, wherein the vehicle speed is reduced to the predefined maximum speed by way of a corresponding increase of the braking torque within a predefined time period.

3. The driver assistance system according to claim 2, wherein the predefined time period is shorter than a time window during which a warning intervention of the speed limiting function is suppressed during the occurrence of the at least one certain condition when the predefinable maximum speed is allowed to be exceeded.

4. A driver assistance system according to claim 2, wherein a plurality of different measures for the corresponding increase of the braking torque are provided so as to reduce the vehicle speed to the predefined maximum speed, wherein the plurality of different measures allow the predefinable maximum speed to be safely achievable within the predefined time period.

5. A driver assistance system according to claim 3, wherein a plurality of different measures for the corresponding increase of the braking torque are provided so as to reduce the vehicle speed to the predefined maximum speed, wherein the plurality of different measures allow the predefinable maximum speed to be safely achievable within the predefined time period.

6. A driver assistance system according to claim 1, wherein a measure for increasing the braking torque is to deactivate or prohibit a coasting operation.

7. A driver assistance system according to claim 2, wherein a measure for increasing the braking torque is to deactivate or prohibit a coasting operation.

8. A driver assistance system according to claim 1, wherein a measure for increasing the braking torque is to activate a regenerative function.

9. A driver assistance system according to claim 2, wherein a measure for increasing the braking torque is to activate a regenerative function.

10. A driver assistance system according to claim 1, wherein a measure for increasing the braking torque is to downshift the automatic transmission and/or to activate secondary consumers.

11. A driver assistance system according to claim 2, wherein a measure for increasing the braking torque is to downshift the automatic transmission and/or to activate secondary consumers.

12. A driver assistance system according claim 1, wherein the at least one certain condition where the predefined maximum speed is allowed to be exceeded is a depression of the gas pedal beyond a defined upper threshold value.

13. A driver assistance system according claim 2, wherein the at least one certain condition where the predefined maximum speed is allowed to be exceeded is a depression of the gas pedal beyond a defined upper threshold value.

14. A driver assistance system according to claim 1, wherein the at least one certain condition where the predefined maximum speed is allowed to be exceeded is a change of the predefined maximum speed to below a current actual vehicle speed.

15. A driver assistance system according to claim 2, wherein the at least one certain condition where the predefined maximum speed is allowed to be exceeded is a change of the predefined maximum speed to below a current actual vehicle speed.

16. A driver assistance system according to claim 1, wherein the at least one certain condition where the predefined maximum speed is allowed to be exceeded is an unrequested increase in vehicle speed so long as a current actual vehicle speed has not risen by more than a predefined comparatively low value above the predefined maximum speed.

17. A driver assistance system according to claim 2, wherein the at least one certain condition where the predefined maximum speed is allowed to be exceeded is an unrequested increase in vehicle speed so long as a current actual vehicle speed has not risen by more than a predefined comparatively low value above the predefined maximum speed.

18. A driver assistance system in a motor vehicle comprising an electronic control unit in a motor vehicle, wherein the electronic control unit is configured to control at least one of an internal combustion engine, electric motor and automatic transmission of the motor vehicle, and wherein the electronic control unit is further configured to:
   implement a speed limiting function by which a predefinable maximum speed for the motor vehicle is not to be exceeded except during the occurrence of at least one predefined condition,
   allow a vehicle speed to exceed the predefined maximum speed only in the event of the occurrence of the at least one predefined condition, and
   reduce a vehicle speed to the predefined maximum speed, within a predefined time period, by increasing a braking torque at a point in time when the at least one predefined condition ceases to occur.

19. A method for implementing a driver assistance system in a motor vehicle comprising the acts of:

implementing, by an electronic control unit in the motor vehicle, a speed limiting function by which a predefinable maximum speed for the motor vehicle is not to be exceeded except during the occurrence of at least one predefined condition;

allowing a vehicle speed to exceed the predefined maximum speed only in the event of the occurrence of the at least one predefined condition; and reducing, by an electronic control unit in the motor vehicle, a vehicle speed to the predefined maximum speed, within a predefined time period, by increasing a braking torque at a point in time when the at least one predefined condition ceases to occur.

* * * * *